United States Patent [19]

Chaffee et al.

[11] Patent Number: 5,171,773
[45] Date of Patent: Dec. 15, 1992

[54] HIGH STRENGTH FLUOROSILICONE RUBBER

[75] Inventors: Roger G. Chaffee; Randall A. Siegel; Rocco J. Voci, all of Midland, Mich.

[73] Assignee: Dow Corning Corporation, Midland, Mich.

[21] Appl. No.: 792,500

[22] Filed: Nov. 13, 1991

[51] Int. Cl.$^5$ ................................................ C08K 3/36
[52] U.S. Cl. .................... 524/493; 524/492; 524/588; 525/477
[58] Field of Search ............. 524/588, 492, 493; 525/477

[56] References Cited

U.S. PATENT DOCUMENTS

| | | | |
|---|---|---|---|
| 3,776,934 | 12/1973 | Toporcer et al. | 260/448.2 N |
| 4,020,044 | 4/1977 | Crossan et al. | 260/46.5 UA |
| 4,347,336 | 8/1982 | Homan et al. | 524/731 |
| 4,387,177 | 6/1983 | Mine et al. | 524/588 |
| 4,433,096 | 2/1984 | Bokerman et al. | 524/588 |
| 4,614,760 | 9/1986 | Homan et al. | 524/860 |
| 4,701,491 | 10/1987 | Lamont et al. | 524/588 |

*Primary Examiner*—Melvyn I. Marquis
*Assistant Examiner*—Karen A. Hellender
*Attorney, Agent, or Firm*—Edward C. Elliott

[57] ABSTRACT

A fluorinated polydiorganosiloxane elastomer having improved physical properties can be obtained through the use of a method which first reacts a hydroxyl endblocked trifluoropropylmethylsiloxane having a Williams Plasticity Number of greater than 225 with a methylvinyldi(N-alkylacetamido)silane to give a chain extended polymer having pendant vinyl groups only at the location of the chain extension. The polymer is then reinforced with fume silica and compounded into a stock. The cured stock has improved tensile strength and tear strength when compared to similar compositions which do not contain the same type of polymer. The polymer has pendant vinyl groups located along the polymer chain, with the distance between them being relatively large. When too many vinyl pendent groups are present along the chain, the improved results are not obtained.

5 Claims, No Drawings

HIGH STRENGTH FLUOROSILICONE RUBBER

BACKGROUND OF THE INVENTION

1. Field of the Invention

This invention relates to trifluoropropyl containing silicone rubbers having improved tensile strengths.

2. Background Information

U.S. Pat. No. 3,776,934, issued Dec. 4, 1973, teaches methylvinyldi-(-N-Methylacetamido)silane and its manufacture. This amidosilane is stated as having unique properties when used as a chain extender in organosiloxane compositions. Use is taught in room temperature vulcanizable silicone elastomer compositions such as those which cure upon exposure to moisture.

U.S. Pat. No. 4,020,044, issued Apr. 26, 1977 discloses mixing methylvinyldi-(-N-alkylacetamido)silane and hydroxyl endblocked polydiorganosiloxane and allowing the mixture to react at room temperature to provide a polydiorganosiloxane having increased molecular weight and methylvinylsiloxane units in the chain. The gums produced can be crosslinked through the use of organic peroxides, such as the vinyl specific organic peroxides.

U.S. Pat. No. 4,347,336, issued Aug. 31, 1982, points out that in order for a composition to be shelf stable and also crosslink upon heating, it is necessary to combine a hydroxyl endblocked polydiorganosiloxane, methylvinylsilyl-bispyrrolidone, and organic peroxide.

U.S. Pat. No. 4,614,760, issued Sep. 30, 1986, teaches low viscosity, one-part compositions of hydroxyl endblocked polydiorganosiloxane, a difunctional silane having two amido radicals, and an organic peroxide. The composition can be put in place, then chain extended to increase the polymer molecular weight to improve the physical properties of the cured elastomer by exposure to moisture. After chain extension, crosslinking is accomplished by heating to activate the organic peroxide.

SUMMARY OF THE INVENTION

High strength fluorosilicone elastomers are obtained by combining hydroxyl endblocked polymethyltrifluoropropylsiloxane gum with methylvinyldi-(-N-Methylacetamido)silane and formulating into fluorosilicone rubber stocks which are then cured with vinyl specific organic peroxides.

DESCRIPTION OF THE INVENTION

A method has been discovered for making a fluorinated polydiorganosiloxane base which can be further compounded to yield an elastomer having improved tensile strength and tear strength. The method comprises (A) shearing in a mixer which is heated to a temperature of from 23° to 100° C. which is being swept by a stream of dry nitrogen (1) 100 parts by weight of hydroxyl endblocked trifluoropropylmethylsiloxane having a Williams Plasticity Number of greater than 225, for a period of time sufficient to remove any free water from the siloxane, then (B) mixing with (2) from 0.1 to 1.5 parts by weight of methylvinyldi(N-alkylacetamido)silane, while continuing the dry nitrogen sweep, at a temperature below 80° C., for a period of time sufficient to increase the Williams Plasticity Number of the polymer, then (C) admixing from 5 to 20 parts by weight of hydroxyl endblocked methyl(trifluoropropyl)polysiloxane having a viscosity of about 0.1 Pa.s at 25° C. and about 6 weight percent hydroxyl radicals, until a uniform mixture is obtained, (D) admixing from 0 to 4 parts by weight of a polydiorganosiloxane fluid having about 5 to 15 weight percent vinyl radicals with the remainder methyl radicals, then (E) admixing from 25 to 50 parts by weight of fume silica having a surface area of at least 200 m$^2$/g at a rate such that the silica is uniformly dispersed into the polymer mixture to give a uniform, high viscosity mixture, then (F) heating while mixing under a vacuum of at least 150 mm Hg, to a temperature of at least 130° C. for a period of at least 1 hour, to give a base.

The above base can then be further compounded in the normal manner and catalyzed with a vinyl specific organic peroxide to give stocks which, when cured, have improved tensile strength and tear strength.

The basis for the improved results obtained by following this method is believed to be the formation of a very high molecular weight polymer having pendent vinyl groups along the chain at very specific locations. Ingredient (1) is a hydroxyl endblocked trifluoropropylmethylsiloxane having a Williams Plasticity Number of greater than 225, as determined in accordance with ASTM D 926. Such a polymer can be obtained by batch polymerization of trifluoropropylmethylcyclosiloxane in the presence of a catalyst such as a trifluoropropylmethylsiloxane sodium salt. It is essential in this invention that the polymer have the necessary chain length, as indicated by the Williams Plasticity Number, because this is then used in the process to determine the spacing of the vinyl groups in the final polymer chain.

Ingredient (2) is methylvinyldi(N-alkylacetamido)silane. The preferred ingredient is methylvinyldi(N-methylacetamido)silane. The method of this invention first dries the hydroxyl endblocked polymer (1) to remove any free water, which would interfere with the following reaction. The dry hydroxyl endblocked polymer is then mixed with the methylvinyldi(alkylacetamido)silane. When mixed, the N-alkylacetamido groups of the silane will react with the hydroxyl endblockers of the polymer, first giving a N-alkylacetamidosilyl endblock on the polymer, then when that endblock reacts with another hydroxyl endblock on another polymer chain, the chains are joined together, giving a vinyl pendant group at the point where the two chains are joined by the silane. It has been discovered that the physical properties of the resulting elastomer are improved when the chain extended polymer is one in which there is the maximum distance between the pendent vinyl groups and the polymer itself has a maximum length.

The minimum amount of the methylvinyldi(N-alkylacetamido)silane (2) is about 0.1 part by weight per 100 parts by weight of polymer (1) in order to obtain any significant chain extension of the polymer. Preferably there is about 0.3 to 1.5 parts of the chain extender. The higher amounts of chain extender not only give the desired high molecular weight polymer, but give a polymer which has improved handling in processing in that it is not as sticky as is found with the lower amounts of chain extender. Amounts of chain extender above 1.5 parts by weight can be used, but do not appear to offer any advantage in obtaining improved properties; the durometer rises and the resiliency increases as the amount of chain extender is raised above about 1.5 parts, while the tensile strength decreases and the elongation increases at 2 and 2.5 parts but then begins to decrease up to 4.5 parts of chain extender.

The high molecular weight polymer having pendant vinyl groups spaced along the chain with relatively high chain length between the vinyl groups is then compounded into a base in a conventional manner by admixing into the polymer a hydroxyl endblocked methyl(trifluoropropyl)polysiloxane (C) followed by fume silica (E) having a surface area of at least 200 m$^2$/g to give the necessary reinforcement to the polymer. The hydroxyl endblocked polysiloxane reacts with the hydroxyl on the surface of the silica to give a surface, treated in situ, containing methyl(trifluoropropyl)silyl groups. This treated silica is easier to properly disperse into the polymer, and the mixture does not crepe upon aging.

The amount of (C) for optimum results is related to the amount of fume silica (E) used, as well as the surface area of the fumed silica used. When 33 parts of a fumed silica having a surface area of about 400 m$^2$/g is combined with 100 parts by weight of polymer, the amount of (C) can vary from 7 to 13 parts by weight per 100 parts per weight of polymer, with from 9 to 10 parts being preferred.

The compression set and handling of the composition can be improved by adding a polydiorganosiloxane fluid (D) having about 5 to 15 weight percent vinyl radicals with the remainder methyl radicals. Polydiorganosiloxane fluid (D) is preferably added before the addition of the fume silica (E). Fluids which have been found suitable include a dimethylvinylsiloxy endblocked copolymer of 78 mol percent dimethylsiloxane units and 22 mol percent of methylvinylsiloxane units having about 7.7 weight percent vinyl radicals and a viscosity of from 8 to 25 Pa.s at 25° C. and a hydroxyl endblocked polydiorganosiloxane having methyl and vinyl radicals and having about 10 weight percent vinyl radical and about 16 weight percent hydroxyl radical. Suitable amounts are up to 4 parts by weight of the first fluid and up to 1.5 parts of the second fluid.

The method then heats the mixture while continuing mixing under a vacuum of at least 150 mm Hg, at a temperature of at least 130° C. for a period of at least 1 hour, to give a base. This heating step is to ensure that all reactions are fully completed and to remove any volatile materials which may have been present or which were formed during the process.

The base is formed into a stock suitable for molding solvent resistant silicone elastomeric parts by adding a vinyl specific organic peroxide, as well as any other additives normally used in silicone stocks, such as extending fillers, heat stability additives, and pigments. The vinyl specific organic peroxides are well known in the art and include ditertiary butyl peroxide, tertiary butyl perbenzoate, dicumyl peroxide, 2,5-bis(tert-butyl peroxy)-2,5-dimethyl hexane, and tert-butylperoxy isopropyl carbonate. Preferred is 2,5-bis(tert-butyl peroxy)-2,5-dimethyl hexane, sold as Lupersol 101 liquid, Luperco 101 powder, and Varox powder.

The following examples are included for illustrative purposes only and should not be construed as limiting the invention which is properly set forth in the appended claims.

EXAMPLE 1

The method of this invention was followed in preparing this sample where 100 parts of hydroxyl endblocked polydiorganosiloxane having about 99.4 mol percent trifluoropropylmethylsiloxane units and 0.6 mol percent methylvinylsiloxane units and a Williams plasticity number of about 280 was placed in a dough type mixer. The mixer was closed, then heated to about 75° C. with a dry nitrogen sweep through the mixer over the polymer in order to remove any free water present in the mixer or in the polymer. After removal of any free water, 0.3 part of chain extender consisting of about 80 percent by weight of methylvinyldi(N-methylacetamido)silane with the remaining 20 percent being impurities consisting primarily of methyl-N-methylacatamide, di(methylvinyl-N-acetamido)methylvinylsilane, and xylene was added to the mixer without opening it to the atmosphere and mixing was continued under these conditions for about 30 minutes. Then 2 parts of dimethylvinylsiloxy endblocked copolymer of 78 mol percent dimethylsiloxane units and 22 mol percent of methylvinylsiloxane units having about 7.7 weight percent vinyl radicals and a viscosity of from 8 to 25 Pa.s at 25° C. was mixed in and then 11.5 parts of hydroxyl endblocked methyl(trifluoropropyl)polysiloxane having a viscosity of about 0.1 Pa.s at 25° C. and about 6 weight percent hydroxyl radicals was mixed in. Then 35 parts of fumed silica having a surface area of about 400 m$^2$/g was admixed by adding it slowly in increments, allowing each increment to be thoroughly blended into the mixture before the next was added. If the fumed silica is added at too rapid a rate, the mixture will become a powder and further dispersion of the silica into the polymer becomes difficult. If this happens, the powder can be returned to a plastic mass by mixing on a two roll mill. After the silica was all added and an additional 30 minutes mixing was allowed to thoroughly disperse the silica, the nitrogen sweep was turned off, the mixer was placed under a vacuum of about 500 mm Hg and the mixer contents were heated to 125° C. for a period of 2 hours. The mixer was then allowed to cool and the finished base was removed. The base had a Williams Plasticity Number of 467.

X7825 A stock was formulated by mixing 100 parts of the above base, 1 part of 50 percent by weight ceric hydrate dispersed in a polydimethylsiloxane gum having hydroxyl endblocker and a Williams Plasticity of about 170 and 1 part of catalyst of 50 percent 2,5 bis(-tert-butylperoxy)-2,5-dimethyl hexane in powdered carrier. This stock was then molded into test sheets by molding in a press into 0.075 inch thick sheets and curing for 10 minutes at 171° C. A portion of the sheet was post-cured for 4 hours at 200° C. Tests were then run of both the press cured and post cured samples with the results shown in Table I. Durometer was measured in accordance with ASTM D 2240, Tensile Strength and Elongation at Break with ASTM D 412, Tear Strength with ASTM D 624, die B, and compression set with ASTM D 395.

A comparative sample 2 was prepared in the same manner, except the polymer was not dried at the beginning of the process. The nitrogen sweep was not begun until after the chain extender (2) was added to the polymer (1). The finished base had a Williams Plasticity Number of 330. This base was then made into a stock and tested as in Example 1 with the results shown in Table I. The inferior physical properties are probably due to the fact that the polymer was not chain extended to the optimum degree because the chain extender reacted with the water that was present in the mixer at the time it was added.

TABLE I

| Sample | Durometer Shore A | Tensile Strength psi | Elongation percent | Tear psi | Compression Set percent |
|---|---|---|---|---|---|
| press cured | | | | | |
| 1 | 37 | 1755 | 629 | 210 | — |
| 2* | 32 | 1274 | 744 | 300 | — |
| post cured | | | | | |
| 1 | 42 | 1856 | 637 | 270 | 32.6 |
| 2* | 38 | 1235 | 697 | 295 | 46.3 |

*comparative example

EXAMPLE 2

A series of samples were prepared using varying levels of chain extender. In each case 100 parts of base was dried first by mixing with a low steam pressure on the mixer and a nitrogen sweep for 45 minutes, then the amount of crosslinker of Example 1 was added as shown in Table II. After 30 minutes mixing to allow chain extension, 3 parts of dimethylvinylsiloxy endblocked copolymer of 78 mol percent dimethylsiloxane units and 22 mol percent of methylvinylsiloxane units having about 7.7 weight percent vinyl radicals and a viscosity of from 8 to 25 Pa.s at 25 C. and 13 parts of hydroxyl endblocked methyl(trifluoropropyl)polysiloxane having a viscosity of about 0.1 Pa.s at 25° C. and about 6 weight percent hydroxyl radicals were mixed in, followed by the slow addition of 40 parts of fumed silica having a surface area of about 250 m$^2$/g. After dispersion of the silica, the mixtures was heated for 1 hour under a vacuum of about 680 mm Hg at a temperature of about 160° C. The plasticity of the resulting bases is shown in Table II.

Each base was compounded into a stock, molded into test samples and tested as in Example I with the results shown in Table II. The lower limit of chain extender needed appears to be about 0.10 part per 100 parts of polymer, as indicated by a marked increase in tensile strength in the post-cured state.

TABLE II

| Sample | Chain Extender parts | Williams Plasticity Number | Durometer Shore A | Tensile Strength psi | Elongation percent | Tear psi |
|---|---|---|---|---|---|---|
| press cured | | | | | | |
| 3* | 0.05 | 353 | 31 | 1045 | 651 | 284 |
| 4 | 0.10 | 394 | 30 | 1127 | 605 | 284 |
| 5 | 0.15 | 450 | 28 | 1427 | 614 | 197 |
| 6 | 0.20 | 460 | 30 | 1469 | 601 | 190 |
| 7 | 0.30 | 411 | 33 | 1554 | 598 | 207 |
| 8 | 0.50 | 427 | 40 | 1651 | 535 | 249 |
| post cured | | | | | | |
| 3* | 0.05 | 353 | 35 | 1185 | 756 | 306 |
| 4 | 0.10 | 394 | 33 | 1382 | 714 | 284 |
| 5 | 0.15 | 450 | 33 | 1676 | 694 | 245 |
| 6 | 0.20 | 460 | 34 | 1685 | 675 | 291 |
| 7 | 0.30 | 411 | 36 | 1597 | 631 | 285 |
| 8 | 0.50 | 427 | 43 | 1719 | 574 | 297 |

EXAMPLE 3

A comparative sample was prepared using a different polymer. First 100 part hydroxyl endblocked polydiorganosiloxane having about 99.4 mol percent trifluoropropylmethylsiloxane units and 0.6 mol percent methylvinylsiloxane units and a Williams Plasiticity Number of about 280 was placed in a mixer and dried as above, then 0.5 part of the chain extender was added and mixed in. Any volatile materials were removed by drawing a vacuum of 500 mm Hg on the mixer for 20 minutes. Then 2 parts of dimethylvinylsiloxy endblocked copolymer of 78 mol percent dimethylsiloxane units and 22 mol percent of methylvinylsiloxane units having about 7.7 weight percent vinyl radicals and a viscosity of from 8 to 25 Pa.s at 25° C. and 11.5 parts of hydroxyl endblocked methyl(trifluoropropyl)polysiloxane having a viscosity of about 0.1 Pa.s at 25° C. and about 6 weight percent hydroxyl radicals were mixed in, followed by the slow addition of 35 parts of fumed silica having a surface area of about 400 m$^2$/g. After dispersion of the silica, the mixture was heated for 30 minutes at 175 psi steam pressure on the mixer with a vacuum of about 480 mm Hg. The base was in the form of a crumb when the mixer was dumped, but the crumb banded readily when tested on a 2 roll mill. The base had a Williams Plasticity Number of 478.

A stock was prepared and tested as in Example 1 with the results shown in Table III.

A similar preparation was done with the substitution of the polymer of Example 1, which is a polymer of this invention, for the above polymer, which is not of this invention. The use of a polymer having vinyl groups along the chain does not give the results obtained using the polymer specified for this invention.

TABLE III

| Sample | Durometer Shore A | Tensile Strength psi | Elongation percent | Tear psi | Compression Set percent |
|---|---|---|---|---|---|
| press cured | | | | | | |
| 9* | 38 | 1225 | 366 | 95 | — |
| 10 | 37 | 1755 | 629 | 210 | — |
| post cured | | | | | | |
| 9* | 44 | 1494 | 366 | 102 | 13 |
| 10 | 42 | 1856 | 637 | 270 | 32 |

*comparative example

EXAMPLE IV

Comparative examples were prepared using polymers having lower molecular weights as the starting polymer. This was intended to give polymers having the vinyl group from the chain extender at closer intervals in the chain of the final polymer.

First 100 parts of hydroxyl endblocked polytrifluoropropyl(methyl)siloxane having a viscosity of about 100 Pa.s at 25° C. (Dp of about 200) was dried by placing in a mixer with a dry nitrogen sweep at a rate 2 standard cubic feet per hour with a vacuum of 29 inches of Hg and heating at a temperature of 60° to 70° C. for one hour. Then 0.76 part of the chain extender was added with the same nitrogen sweep, no vacuum, and a temperature of from 30° to 35° C. for 10 minutes. The chain-extended gum was deaired by applying a 29 inch Hg vacuum and mixing for 4 minutes with cooling water on the mixer. The resulting high polymer had a Williams Plasticity Number of 566. The weight average molecular weight was about 2,640,000 and the number average molecular weight was about 1,550,000, which would be equivalent to a Dp of about 9925.

Next a base was prepared by mixing the polymer with 2 parts of dimethylvinylsiloxy endblocked copolymer of 78 mol percent dimethylsiloxane units and 22 mol percent of methylvinylsiloxane units having about 7.7 weight percent vinyl radicals and a viscosity of from 8 to 25 Pa.s at 25° C. and 13 parts of hydroxyl endblocked methyl(trifluoropropyl)polysiloxane having a viscosity of about 0.1 Pa.s at 25° C. and about 6 weight percent hydroxyl radicals, then slowly admixing 33 parts of fumed silica having a surface area of about 250 m²/g. After dispersion of the silica, the base was heated for 1 hour under a vacuum of about 26 inches of Hg at a temperature of about 155° C. The Williams Plasticity Number of the resulting base was about 370.

The base was compounded into a stock, molded into test samples and tested as in Example I with the results shown in Table IV as sample 11.

Another comparative samples was prepared using a polymer having a shorter chain length. First 100 parts of hydroxyl endblocked polytrifluoropropyl(methyl)siloxane having a viscosity of about 10 Pa.s at 25° C. (Dp of about 80) was dried and mixed with 2.2 parts of the chain extender as above. The resulting high polymer had a Williams Plasticity Number of 400. The weight average molecular weight was about 1,030,000 and the number average molecular weight was about 541,900, which would be equivalent to a Dp of about 3500.

Next a base was prepared and a stock was prepared from the base in the same manner as described immediately above. The results are shown in Table IV as sample 12.

TABLE IV

| Sample | Durometer Shore A | Tensile Strength psi | Elongation percent | Tear psi | Compression Set percent |
|---|---|---|---|---|---|
| press cured | | | | | |
| 11* | 34 | 1174 | 346 | 56 | 24.2 |
| 12* | 59 | 800 | 83 | 24 | 11.1 |
| post cured | | | | | |
| 11* | 39 | 1440 | 347 | 77 | 21 |
| 12* | 62 | 776 | 79 | 28 | 9.4 |

*comparative example

EXAMPLE 5

A series of samples was prepared in which the amount of chain extender was raised to determine the effect of excessive amounts.

First, 100 parts of the starting polymer of Example 1 was added to a mixer and subjected with mixing to a nitrogen purge for 5 minutes. The amount of chain extender shown in Table V was then slowly added in small increments that allowed the forming high polymer to stay as a gum rather than crumbling into a powder. The additions took from 30 to 45 minutes. After all of the chain extender was added, 2 parts of dimethylvinylsiloxy endblocked copolymer of 78 mol percent dimethylsiloxane units and 22 mol percent of methylvinylsiloxane units having about 7.7 weight percent vinyl radicals and a viscosity of from 8 to 25 Pa.s at 25 C. was added and mixed for 10 minutes, then 13 parts of hydroxyl endblocked methyl(trifluoropropyl)polysiloxane having a viscosity of about 0.1 Pa.s at 25° C. and about 6 weight percent hydroxyl radicals was added and mixed for 10 minutes. Finally 43 parts of fumed silica having a surface area of about 250 m²/g was added in ⅓ increments with each increment being fully dispersed before the next was added. After all of the fumed silica was added, the mixture was heated to about 170° C. under a vacuum of about 26-28 mm Hg for 1 hour with a nitrogen sweep through the mixer. The bases were then cooled with the vacuum and nitrogen sweep continued.

The base was compounded into a stock, tested for plasticity, molded into test samples and tested as in Example I with the results shown in Table V.

TABLE V

| Sample | Chain Extender parts | Williams Plasticity Number | Durometer Shore A | Tensile Strength psi | Elongation percent | Tear psi |
|---|---|---|---|---|---|---|
| | | | press cured | | | |
| 13 | 1.5 | 400 | 54 | 1897 | 429 | 312 |
| 14 | 2.0 | — | 52 | 1738 | 485 | 310 |
| 15 | 2.5 | 363 | 51 | 1731 | 505 | 301 |
| 16 | 3.5 | 378 | 62 | 1801 | 352 | 201 |
| 17 | 4.5 | 383 | 62 | 1698 | 372 | 207 |
| | | | post cured | | | |
| 13 | 1.5 | 400 | 57 | 1839 | 421 | 282 |
| 14 | 2.0 | — | 55 | 1747 | 473 | 320 |
| 15 | 2.5 | 363 | 57 | 1680 | 462 | 300 |
| 16 | 3.5 | 378 | 65 | 1710 | 316 | 229 |
| 17 | 4.5 | 383 | 66 | 1690 | 364 | 180 |

That which is claimed is:

1. A method of making a fluorinated polydiorganosiloxane base which when cured gives an elastomer having improved tensile strength and tear strength, the method consisting essentially of
   (A) shearing in a mixer which is heated to a temperature of from 23° to 100° C. which is being swept by a stream of dry nitrogen
      (1) 100 parts by weight of hydroxyl endblocked trifluoropropylmethylsiloxane having a Williams Plasticity Number of greater than 225, for a period of time sufficient to remove any free water from the siloxane, then
   (B) mixing with
      (2) from 0.1 to 1.5 parts by weight of methylvinyldi(N-alkylacetamido)silane, while continuing the dry nitrogen sweep, at a temperature below 80° C., for a period of time sufficient to increase the Williams Plasticity Number of the polymer, then
   (C) admixing from 5 to 20 parts by weight of hydroxyl endblocked methyl(trifluoropropyl)polysiloxane having a viscosity of about 0.1 Pa.s at 25° C. and about 6 weight percent hydroxyl radicals, until a uniform mixture is obtained,
   (D) admixing from 0 to 4 parts by weight of a polydiorganosiloxane fluid having about 5 to 15 weight percent vinyl radicals with the remainder methyl radicals, then
   (E) admixing from 25 to 50 parts by weight of fume silica having a surface area of at least 200 m²/g at a rate such that the silica is uniformly dispersed into the polymer mixture to give a uniform, high viscosity mixture, then
   (F) heating while mixing under a vacuum of at least 150 mm Hg, to a temperature of at least 130° C. for a period of at least 1 hour, to give a base.

2. A method of making a fluorinated polydiorganosiloxane stock comprising mixing the base of claim 1 with a vinyl specific organic peroxide, to give a silicone rubber stock which when cured will yield an elastomer having improved tensile strength and tear strength.

3. The fluorinated polydiorganosiloxane base produced by the method of claim 1.

4. The fluorinated polydiorganosiloxane stock produced by the method of claim 2.

5. The fluorinated polydiorganosiloxane elastomer obtained by curing the stock of claim 4.

* * * * *